Mar. 20, 1923. 1,449,292.
A. J. NATHAN ET AL.
DEVICE FOR USE WITH VACUUM FLASKS.
FILED JULY 25, 1922.

Inventors
Alfred J. Nathan
Arthur E. Barclay
By
James L. Norris
Attorney

Patented Mar. 20, 1923.

1,449,292

UNITED STATES PATENT OFFICE.

ALFRED JERROLD NATHAN AND ARTHUR EDWARD BARCLAY, OF LONDON, ENGLAND; SAID BARCLAY ASSIGNOR TO SAID NATHAN.

DEVICE FOR USE WITH VACUUM FLASKS.

Application filed July 25, 1922. Serial No. 577,355.

*To all whom it may concern:*

Be it known that we, ALFRED JERROLD NATHAN and ARTHUR EDWARD BARCLAY, subjects of the King of Great Britain, residing at London, England, have invented certain new and useful Improvements in a Device for Use with Vacuum Flasks, of which the following is a specification.

The object of this invention is to provide a means for use with vacuum flasks to adapt such flasks for use as feeding bottles for children, thus making it possible to keep infants' food warm for a considerable period of time after preparation, which is of great advantage when infants are fed out of doors or in bed at night.

For the purpose of this invention we provide a stopper or cork so made as to fit any vacuum or thermos flask and which can be substituted for the ordinary cork of the flask when required for use. Said stopper or cork is provided with a teat which has communication through the stopper with the interior of the flask and is also provided with an inlet valve so as to allow for the access of air to replace the vacuum caused by the withdrawal of milk or food from the flask when the child is feeding.

Figure 1:
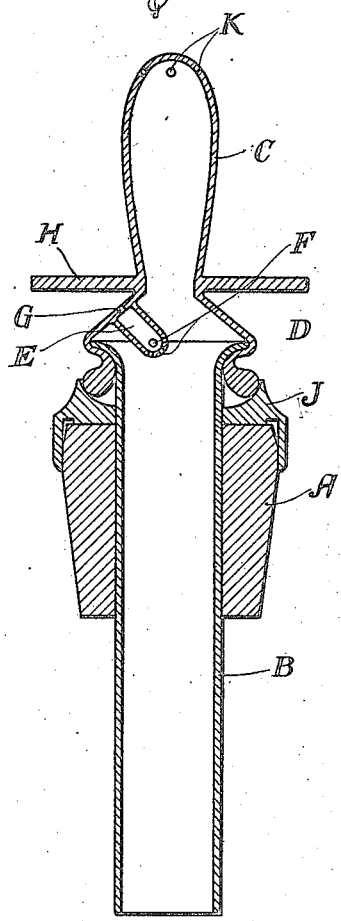
Figure 2:
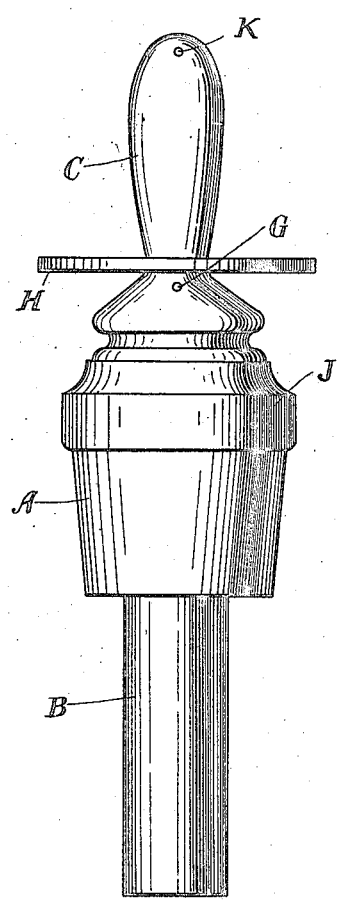

Our invention will be clearly understood from the following description aided by the annexed drawings in which Figure 1 is a vertical section and Figure 2 is a view in elevation of a stopper embodying the preferred form of our invention.

The preferred form of our invention consists of a stopper or plug A of cork or india rubber having an axial bore in which is positioned a glass tube B, having a flange D at its upper end. The teat C is securely fixed on the flange D of the glass tube B and an inlet valve E is formed as part of or attached to the teat C. The valve E may consist of a small nipple or projection formed or attached on the inside of the teat C and having one or more holes F in same and a hole G in the teat C communicating with the nipple such nipple being secured at its inner or open end to the glass tube B.

A shield of rubber H, bone or other suitable material may be secured to the teat C on the outside of the air valve E to prevent the lips of a child, when feeding, from covering the air valve E.

A ring J of celluloid, vulcanite or other suitable material is mounted upon the outer end of the stopper A. This ring J has a depending flange which encircles and frictionally engages the upper end of the stopper A and is dished on its upper surface to partly engage and cover the thickened edge of the teat C.

The bore of the stopper A is of such size as to just frictionally grip the tube B and the depending flange of the ring J is of such diameter as to just go over and frictionally grip the plug A so that all of the parts can be easily taken apart for sterilization.

The usual holes K for the delivery of the food are formed in the end of the teat C.

What we do claim as our invention and desire to secure by Letters Patent is:—

1. A device for use with vacuum flasks and the like whereby said flask can be used as a feeding bottle, comprising a stopper having an aperture therethrough, a tube in said aperture, a concave ring on said plug, a teat on said tube having portions thereof extending into said concavity, a shield surrounding and attached to the teat, said teat having apertures above and below said shield, and a valve controlling the aperture beneath said shield for admitting air to said receptacle when a vacuum is created therein.

2. A device for converting vacuum flasks and the like into a nursing bottle, comprising a bored stopper, a rigid tube extending through said bore and frictionally held therein, said tube having an outwardly extending flange at one end, and a nipple attached to said flanged end, the said nipple having an air inlet valve therein, positioned above the flanged end.

3. A nursing device for use with vacuum flasks and the like comprising a bored stopper, a tube frictionally held in said bore and having a flange at one end, a nipple secured over said flange, said nipple having a constricted portion and a shield surrounding said constricted portion, and a ring having a recess therein to receive the upper end of the stopper and having a dished upper portion to engage the edge of the nipple.

In testimony whereof we have hereunto set our hands in presence of two subscribing witnesses.

ALFRED JERROLD NATHAN.
ARTHUR EDWARD BARCLAY.

Witnesses:
FRED H. SHIUP,
H. E. MORGAN.